US012602441B2

(12) United States Patent
Gong et al.

(10) Patent No.: US 12,602,441 B2
(45) Date of Patent: Apr. 14, 2026

(54) SELF-SUPERVISED LEARNING THROUGH DATA AUGMENTATION FOR RECOMMENDATION SYSTEMS

(71) Applicant: Roblox Corporation, San Mateo, CA (US)

(72) Inventors: Xiaohong Gong, Sunnyvale, CA (US); Frank Ong, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 721 days.

(21) Appl. No.: 17/986,667

(22) Filed: Nov. 14, 2022

(65) Prior Publication Data

US 2024/0160677 A1 May 16, 2024

(51) Int. Cl.
*G06F 16/9535* (2019.01)
*G06N 3/045* (2023.01)

(52) U.S. Cl.
CPC ......... *G06F 16/9535* (2019.01); *G06N 3/045* (2023.01)

(58) Field of Classification Search
CPC ............................. G06F 16/9535; G06N 3/045
See application file for complete search history.

(56) References Cited

U.S. PATENT DOCUMENTS

| | | | | |
|---|---|---|---|---|
| 11,823,041 B1 * | 11/2023 | Hart | ..................... | G06Q 30/016 |
| 2021/0374098 A1 * | 12/2021 | Holmdahl | ............. | A63F 13/323 |
| 2023/0342831 A1 * | 10/2023 | Nath | .................. | G06Q 30/0631 |
| 2024/0428075 A1 * | 12/2024 | Gong | ................. | G06Q 30/0631 |

OTHER PUBLICATIONS

Chen, et al., "A Simple Framework for Contrastive Learning of Visual Representations", ICML; retrieved from Internet: https://arxiv.org/pdf/2002.05709.pdf, 2020, 20 pages.
Devlin, et al., "BERT: Pre-training of Deep Bidirectional Transformers for Language Understanding", NAACL-HLT; retrieved from Internet: https://arxiv.org/pdf/1810.04805.pdf?source=post_elevate_sequence_page, 2019, 16 pages.

(Continued)

*Primary Examiner* — Maher N Algibhah

(74) *Attorney, Agent, or Firm* — IP Spring

(57) ABSTRACT

A computer-implemented method to train a machine-learning model to recommend virtual experiences to a user. The method includes receiving training data that includes original training examples corresponding to a set of virtual experiences, where individual training examples comprise user features and item features. The method further generating augmented training examples by modifying one or more of a user feature or an item feature from corresponding original training examples. The method further extracting respective representation embeddings from the original training examples and the augmented training examples. The method further includes determining a loss function such that: a first loss between representation embeddings of individual original training examples and representation embeddings of corresponding augmented training examples is minimized and a second loss between the representation embeddings of individual original training examples and representation embeddings of non-corresponding augmented training examples is maximized.

20 Claims, 12 Drawing Sheets

(56) References Cited

OTHER PUBLICATIONS

Van Den Oord, et al., "Representation Learning with Contrastive Predictive Coding", arXiv preprint arXiv:1807.03748, 2018, 13 pages.

Yao, et al., "Self-supervised Learning for Deep Models in Recommendations", RecSys; retrieved from Internet: https://arxiv.org/pdf/2007.12865.pdf, 2020, 10 pages.

* cited by examiner

1100

Receive training data that includes original training examples corresponding to a set of virtual experiences, where individual training examples comprise user features and item features 1102

Generate augmented training examples by modifying one or more of a user feature or an item feature from corresponding original training examples 1104

Extract respective representation embeddings from the original training examples and the augmented training examples 1106

Determine a loss function such that:
- a first loss between representation embeddings of individual original training examples and representation embeddings of corresponding augmented training examples is minimized; and
- a second loss between the representation embeddings of individual original training examples and representation embeddings of non-corresponding augmented training examples is maximized 1108

FIG 11

1200

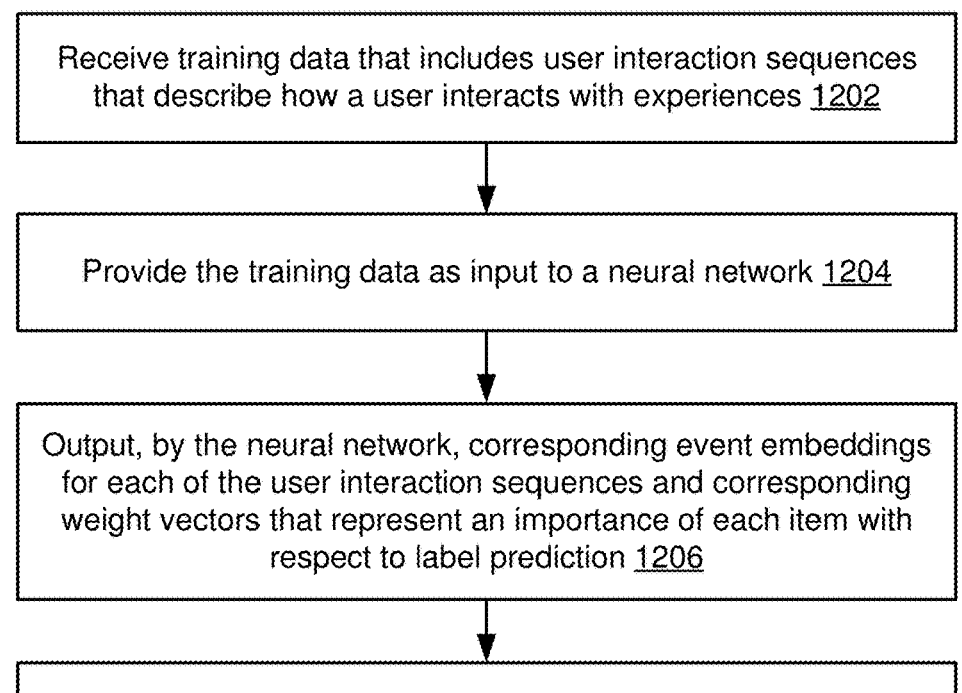

Receive training data that includes user interaction sequences that describe how a user interacts with experiences 1202

Provide the training data as input to a neural network 1204

Output, by the neural network, corresponding event embeddings for each of the user interaction sequences and corresponding weight vectors that represent an importance of each item with respect to label prediction 1206

Generate a weighted embedding based on the event embeddings and the weight vectors 1208

FIG 12

SELF-SUPERVISED LEARNING THROUGH DATA AUGMENTATION FOR RECOMMENDATION SYSTEMS

BACKGROUND

Recommendation systems are excellent at recommending experiences to users when information is known about the users and when information is known about the experiences. However, for a brand-new user or for a brand-new experience, it is difficult to generate recommendations. This problem is further complicated by a tendency in recommendation systems to prioritize established experiences over newer experiences, which results in newer experiences being less frequently recommended.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments relate generally to a method to train a machine-learning model to recommend virtual experiences to a user. The method includes receiving training data that includes original training examples corresponding to a set of virtual experiences, where individual training examples comprise user features and item features. The method further generating augmented training examples by modifying one or more of a user feature or an item feature from corresponding original training examples. The method further extracting respective representation embeddings from the original training examples and the augmented training examples. The method further includes determining a loss function such that: a first loss between representation embeddings of individual original training examples and representation embeddings of corresponding augmented training examples is minimized and a second loss between the representation embeddings of individual original training examples and representation embeddings of non-corresponding augmented training examples is maximized.

In some embodiments, the original training examples include a sparse feature that includes a plurality of values, and generating the augmented training examples comprises setting at least one of the plurality of values of the sparse feature to zero. In some embodiments, generating the augmented training examples comprises setting all of the plurality of values of the sparse feature to zero to masking the sparse feature. In some embodiments, the augmented training examples include a sparse feature that include a sequence of two or more values, and generating the augmented training examples comprises reordering at least a subset of the two or more values. In some embodiments, the augmented training examples include a sparse feature that include a sequence of two or more values, and generating the augmented training examples comprises selecting a continuous subsequence from the sequence of two or more values, wherein the continuous subsequence excludes at least one value of the two or more values. In some embodiments, the method further includes prior to determining the loss function, projecting the respective representation embeddings to a loss computation space. In some embodiments, the original training examples include a feature embedding comprising a plurality of bits, and generating the augmented training examples comprises modifying one or more of the plurality of bits. In some embodiments, the machine-learning model is a recommender model that identifies candidate virtual experiences or a ranking model that ranks the candidate virtual experiences to recommend to the user. In some embodiments, the method further includes: receiving first user features for a first user, generating candidate virtual experiences, determining, by the machine-learning model, a ranked subset of the candidate virtual experiences, and providing a user interface that includes the ranked subset of the candidate virtual experiences. In some embodiments, the machine-learning model includes a user tower and an item tower, wherein the user tower includes a first deep neural network (DNN) that generates user embeddings based on the user features and the item tower includes a second DNN that generates item embeddings based on the item features, and wherein the loss function includes a first loss function for the user tower and a second loss function for the item tower. In some embodiments, the user embeddings are further based on sequence user features that are generated from user interactions with different virtual experiences and attention modeling. In some embodiments, the attention modeling is trained by generating event embeddings for each set of user sequence features that correspond to a same user interaction sequence, generating weight vectors that correspond to the event embeddings, and generating a weighted embedding by multiplying the event embeddings by the weight vectors. In some embodiments, the attention modeling is trained by generating event embeddings for each set of user sequence features that correspond to a same user interaction sequence, providing the event embeddings as input to a neural network, outputting weight vectors with the neural network, and generating a weighted embedding by multiplying the event embeddings by the weight vectors. In some embodiments, the attention modeling is trained by generating event embeddings for each set of user sequence features that correspond to a same user interaction sequence, pooling the event embeddings and concatenating pooled event embeddings with the event embeddings as input along with other context features to a neural network, outputting weight vectors with the neural network, and generating a weighted embedding by multiplying the event embeddings by the weight vectors.

According to one aspect, a device includes a processor and a memory coupled to the processor, with instructions stored thereon that, when executed by the processor, cause the processor to perform operations comprising: receiving training data that includes original training examples corresponding to a set of virtual experiences, where individual training examples comprise user features and item features, generating augmented training examples by modifying one or more of a user feature or an item feature from corresponding original training examples, extracting respective representation embeddings from the original training examples and the augmented training examples, and determining a loss function such that: a first loss between representation embeddings of individual original training examples and representation embeddings of corresponding augmented training examples is minimized and a second loss between the representation embeddings of individual original training examples and representation embeddings of non-corresponding augmented training examples is maximized.

In some embodiments, the original training examples include a sparse feature that includes a plurality of values, and generating the augmented training examples comprises setting at least one of the plurality of values of the sparse feature to zero. In some embodiments, generating the augmented training examples comprises setting all of the plurality of values of the sparse feature to zero to masking the sparse feature.

According to one aspect, non-transitory computer-readable medium with instructions stored thereon that, when executed by one or more computers, cause the one or more computers to perform operations, the operations comprising: receiving training data that includes original training examples corresponding to a set of virtual experiences, where individual training examples comprise user features and item features, generating augmented training examples by modifying one or more of a user feature or an item feature from corresponding original training examples, extracting respective representation embeddings from the original training examples and the augmented training examples, and determining a loss function such that: a first loss between representation embeddings of individual original training examples and representation embeddings of corresponding augmented training examples is minimized and a second loss between the representation embeddings of individual original training examples and representation embeddings of non-corresponding augmented training examples is maximized.

In some embodiments, the original training examples include a sparse feature that includes a plurality of values, and generating the augmented training examples comprises setting at least one of the plurality of values of the sparse feature to zero. In some embodiments, generating the augmented training examples comprises setting all of the plurality of values of the sparse feature to zero to masking the sparse feature.

The application advantageously describes a metaverse engine that trains a machine-learning model to recommend virtual experiences to a user with limited experience history or recommends new virtual experiences with limited interaction histories to a user.

BRIEF DESCRIPTION OF THE DRAWINGS

FIG. 11 is a flow diagram of an example method to train a machine-learning model using augmented training examples, according to some embodiments described herein.

FIG. 12 is a flow diagram of an example method to train a machine-learning model to output a weighted embedding from user interaction sequences, according to some embodiments described herein.

DETAILED DESCRIPTION

Network Environment 100

Figure 1:
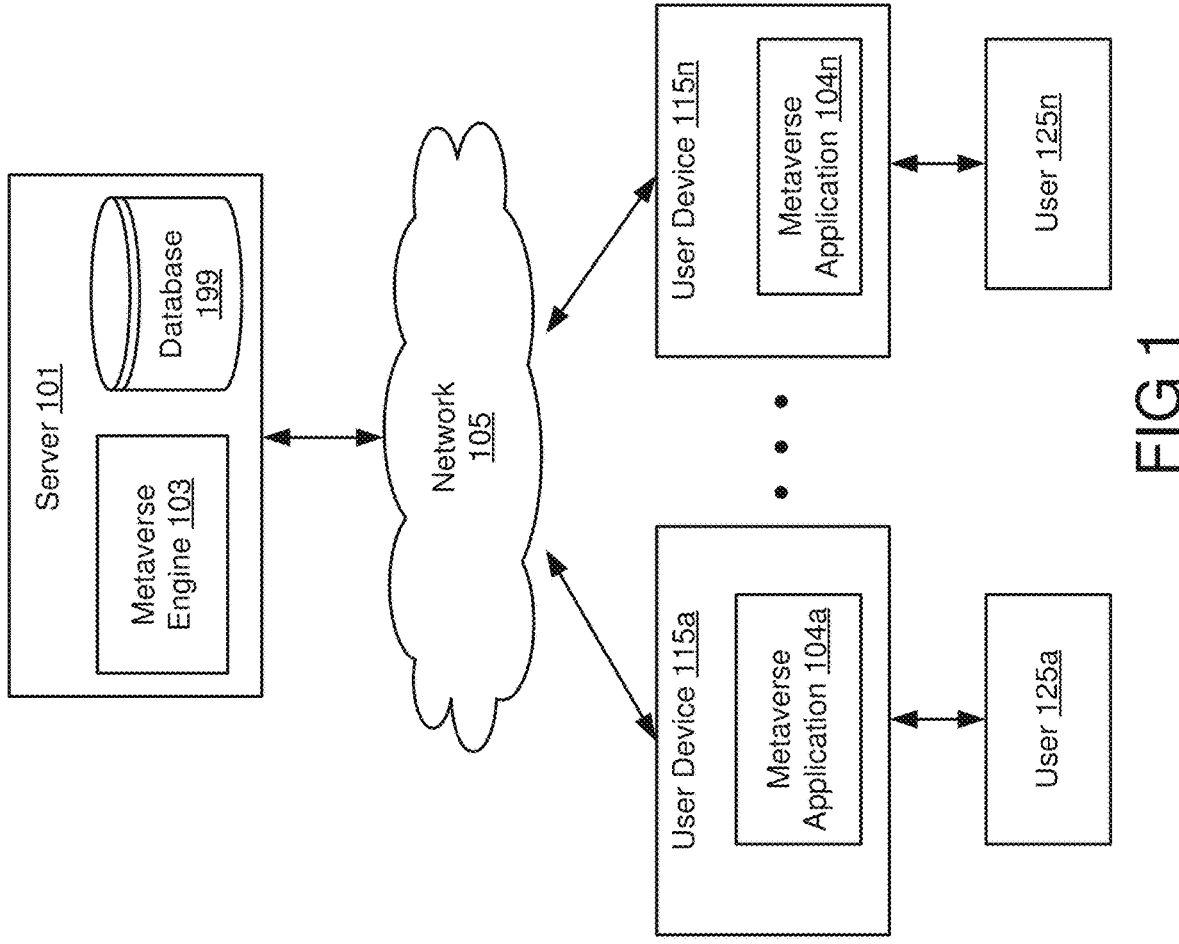
FIG. 1 is a block diagram of an example network environment to train a machine-learning model to recommend virtual experiences to users, according to some embodiments described herein.
Figure 1:

FIG. 1 illustrates a block diagram of an example environment 100 to train a machine-learning model to recommend virtual experiences to users. In some embodiments, the environment 100 includes a server 101, user devices 115*a* . . . *n*, and a network 105. Users 125*a* . . . *n* may be associated with the respective user devices 115*a* . . . *n*. In FIG. 1 and the remaining figures, a letter after a reference number, e.g., "115*a*," represents a reference to the element having that particular reference number. A reference number in the text without a following letter, e.g., "115," represents a general reference to embodiments of the element bearing that reference number. In some embodiments, the environment 100 may include other servers or devices not shown in FIG. 1. For example, the server 101 may be multiple servers 101.

The server 101 includes one or more servers that each include a processor, a memory, and network communication hardware. In some embodiments, the server 101 is a hardware server. The server 101 is communicatively coupled to the network 105. In some embodiments, the server 101 sends and receives data to and from the user devices 115. The server 101 may include a metaverse engine 103 and a database 199.

In some embodiments, the metaverse engine 103 includes code and routines operable to receive communications between two or more users in a virtual metaverse, for example, at a same location in the metaverse, within a same metaverse experience, or between friends within a metaverse application. The users interact within the metaverse across different demographics (e.g., different ages, regions, languages, etc.).

In some embodiments, the metaverse engine 103 receives training data that includes original training examples corresponding to a set of virtual experiences, where individual training examples comprise user features and item features. The metaverse engine 103 generates augmented training examples by modifying one or more of a user feature or an item feature from corresponding original training examples. The metaverse engine 103 extracts respective representation embeddings from the original training examples and the augmented training examples. The metaverse engine 103 determines a loss function such that: a first loss between the representation embedding of individual original training examples and the representation embedding of corresponding augmented training examples is minimized and a second loss between the representation embedding of individual original training examples and the representation embeddings of non-corresponding augmented training examples is maximized.

In some embodiments, the metaverse engine 103 is implemented using hardware including a central processing unit (CPU), a field-programmable gate array (FPGA), an application-specific integrated circuit (ASIC), any other type of processor, or a combination thereof. In some embodiments, the metaverse engine 103 is implemented using a combination of hardware and software.

The database 199 may be a non-transitory computer readable memory (e.g., random access memory), a cache, a drive (e.g., a hard drive), a flash drive, a database system, or another type of component or device capable of storing data. The database 199 may also include multiple storage components (e.g., multiple drives or multiple databases) that may also span multiple computing devices (e.g., multiple server computers). The database 199 may store data associated with the metaverse engine 103, such as training data sets for the trained machine-learning model, user actions and user features associated with each user 125, item features associated with each virtual experience, etc.

The user device 115 may be a computing device that includes a memory and a hardware processor. For example, the user device 115 may include a mobile device, a tablet computer, a mobile telephone, a wearable device, a head-mounted display, a mobile email device, a portable game player, a portable music player, or another electronic device capable of accessing a network 105.

User device 115a includes metaverse application 104a and user device 115n includes metaverse application 104n, respectively. In some embodiments, the metaverse application 104 on a user device 115 receives one or more recommended virtual experiences from the metaverse engine 103 on the server 101. The metaverse application 104 generates a user interface that displays the one or more recommended virtual experiences to the user 125.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the server 101 and the user devices 115, in practice one or more networks 105 may be coupled to these entities.

Computing Device Example 200

Figure 2:
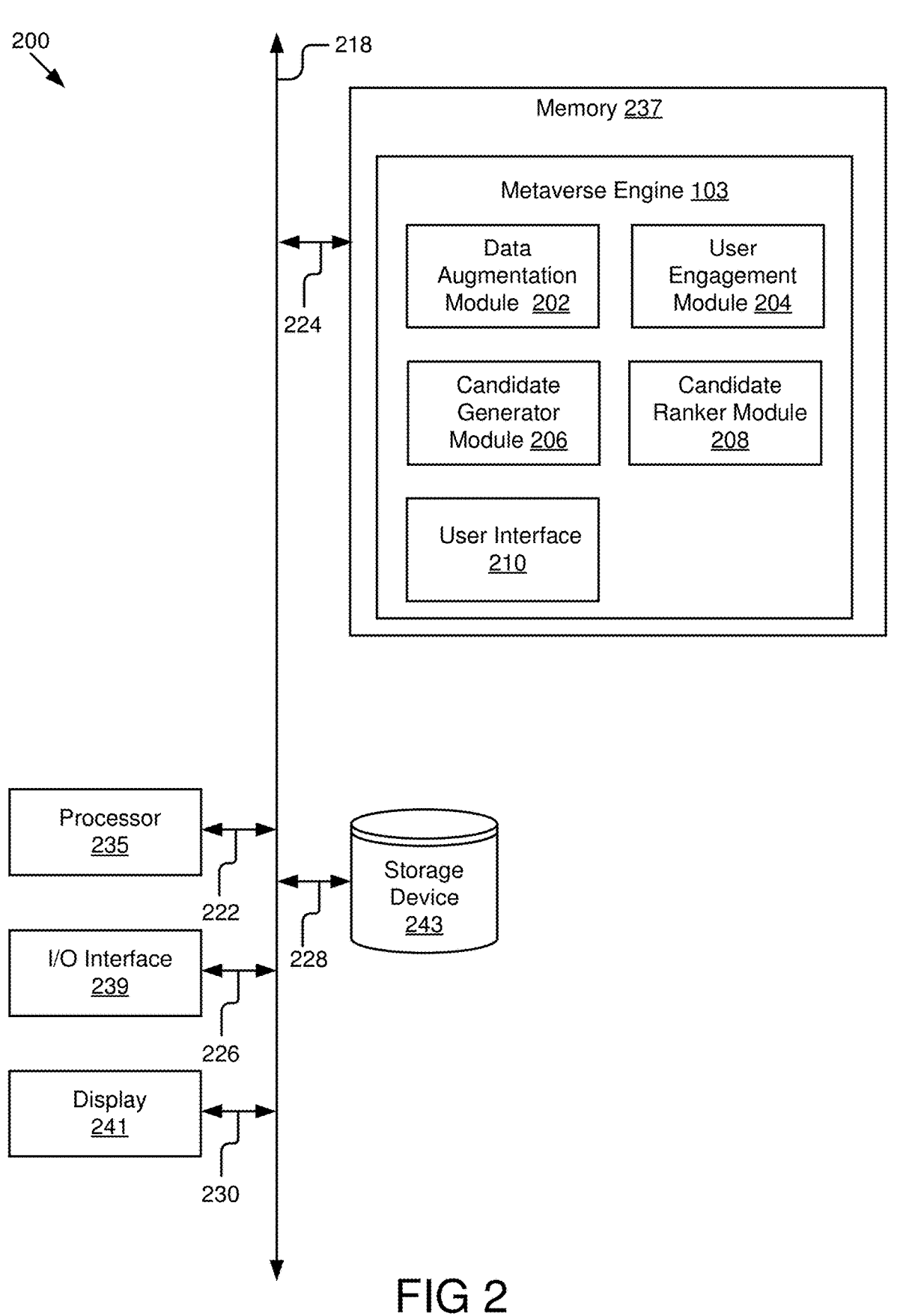
FIG. 2 is a block diagram of an example computing device to train a machine-learning model to recommend virtual experiences to users, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the server 101. In some embodiments, the computing device 200 is the user device 115.

In some embodiments, computing device 200 includes a processor 235, a memory 237, an Input/Output (I/O) interface 239, a display 241, and a storage device 243. Depending on whether the computing device 200 is the server 101 or the user device 115, some components of the computing device 200 may not be present. For example, in instances where the computing device 200 is the server 101, the computing device may not include the display 241. In some embodiments, the computing device 200 includes additional components not illustrated in FIG. 2.

The processor 235 may be coupled to a bus 218 via signal line 222, the memory 237 may be coupled to the bus 218 via signal line 224, the I/O interface 239 may be coupled to the bus 218 via signal line 226, the display 241 may be coupled to the bus 218 via signal line 230, and the storage device 243 may be coupled to the bus 218 via signal line 228.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the metaverse engine 103, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 243), and input/output devices can communicate via I/O interface 239. In another example, the I/O interface 239 can receive data from user device 115 and deliver the data to the metaverse engine 103 and components of the metaverse engine 103, such as the candidate generator module 206. In some embodiments, the I/O interface 239 can connect to interface devices such as input devices (keyboard, pointing device, touchscreen, microphone, sensors, etc.) and/or output devices (display devices, speakers, monitors, etc.).

Some examples of interfaced devices that can connect to I/O interface 239 can include a display 241 that can be used to display content, e.g., images, video, and/or a user interface of an output application as described herein, and to receive touch (or gesture) input from a user. Display 241 can include any suitable display device such as a liquid crystal display (LCD), light emitting diode (LED), or plasma display screen, cathode ray tube (CRT), television, monitor, touchscreen, three-dimensional display screen, or other visual display device.

The storage device 243 stores data related to the metaverse engine 103. For example, the storage device 243 may store training data sets for the trained machine-learning model, user actions and user features associated with each user 125, item features associated with each virtual experience, etc. In embodiments where the computing device 200 is the server 101, the storage device 243 is the same as the database 199 in FIG. 1.

Example Metaverse Engine 103 or Metaverse Application 104

FIG. 2 illustrates a computing device 200 that executes an example metaverse engine 103 that includes a data augmentation module 202, a user engagement module 204, a candidate generator module 206, a candidate ranker module 208, and a user interface module 210.

The data augmentation module 202 generates augmented training examples that are used to generate recommended virtual experiences and/or to rank the recommended virtual experiences. In some embodiments, the data augmentation module 202 includes a set of instructions executable by the processor 235 to generate the augmented training examples. In some embodiments, the data augmentation module 202 is stored in the memory 237 of the computing device 200 and can be accessible and executable by the processor 235.

In some embodiments, the candidate generator module 206 recommends virtual experiences to a user. The virtual experiences may include any type of event that may be experienced by a user. For example, the virtual experience may be a game that a user plays, a movie that a user watches, an article that a user reads, a virtual concert or meeting that a user attends, etc.

Figure 3:
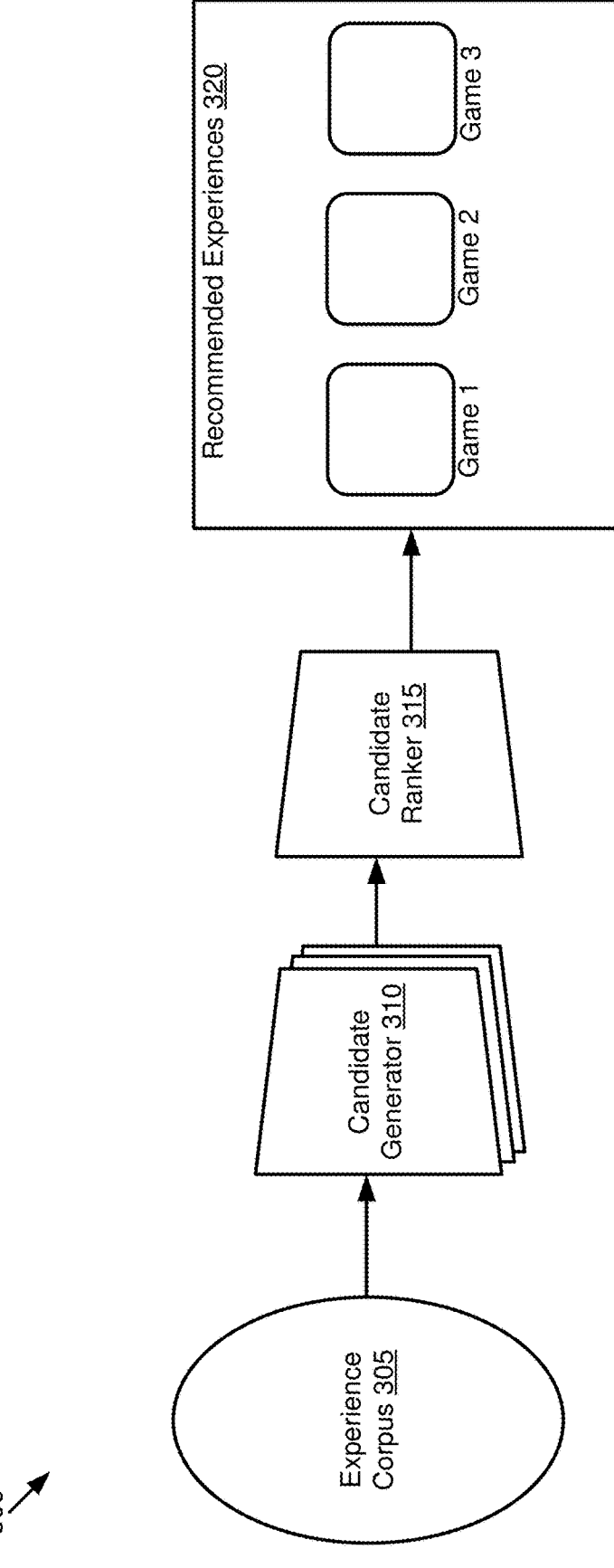
FIG. 3 is a block diagram of an example process to recommend virtual experiences to a user, according to some embodiments described herein.

In some embodiments, the process for recommending virtual experiences is broken into four stages. FIG. 3 is a block diagram 300 of an example process to recommend virtual experiences to a user. In this example, the process is divided into an experience corpus 305, one or more candidate generators 310, a candidate ranker 315, and recommended experiences 320. The experience corpus 305 includes all the virtual experiences available to a user. The corpus 305 may include hundreds of thousands or even millions of virtual experiences. The one or more candidate generators 310 retrieve the top K virtual experiences from the corpus 305. The candidate ranker 315 ranks the top K virtual experiences based on users' own interests, history, and context, and outputs the top N virtual experiences. The top N virtual experiences are then displayed to a user, for example, by transmitting graphical data for displaying the top N virtual experiences from the server 101 to a user device 115.

In some embodiments, both the candidate generator 310 and the candidate ranker 315 include deep neural network (DNN) models that include layers that identify increasingly more detailed features and patterns about the different embeddings where the output of one layer serves as input to a subsequent layer. Training DNNs may involve using large sets of labelled training data due to the large number of parameters that are part of the DNNs. Specifically, the DNNs generate embeddings that are improved by larger training data sets. Otherwise, the DNNs may overly rely on highly skewed data.

A user may be described by user features and a virtual experience may be described by item features. User features may include, for example, demographic information for a user (location, gender, age, etc.), user interaction history (e.g., duration of interaction with a virtual experience, clicks during the interaction, money spent during the interaction, etc.), context features (e.g., device identifier, an internet protocol (IP) address for the client device, country), user identifiers (ID) for people that the user plays with, etc. The item features may include a universe ID (i.e., the unique identifier for a virtual experience, such as a game), the daily active users (i.e., the number of active users that interact with the virtual experience in the past predetermined number of days), an identification of a developer of the virtual experience, how many developer items are in the virtual experience, the release date for the virtual experience, etc.

The candidate generator 310 and the candidate ranker 315 are trained with user features and item features. For example, the candidate generator 310 may be a two-tower model that generates user embeddings and item embeddings and compares the user embeddings and item embeddings to each other to generate the candidate virtual experiences. As a result, the training data includes original training examples corresponding to a set of virtual experiences, where individual training examples comprise user features and item features.

In some embodiments, the data augmentation module 202 improves the training data by generating augmented training examples by modifying a user feature, an item feature, or both from corresponding original training examples. FIGS. 4A-4D are block diagrams of example types of feature augmentation.

Figures 4A, 4B, 4C, 4D:
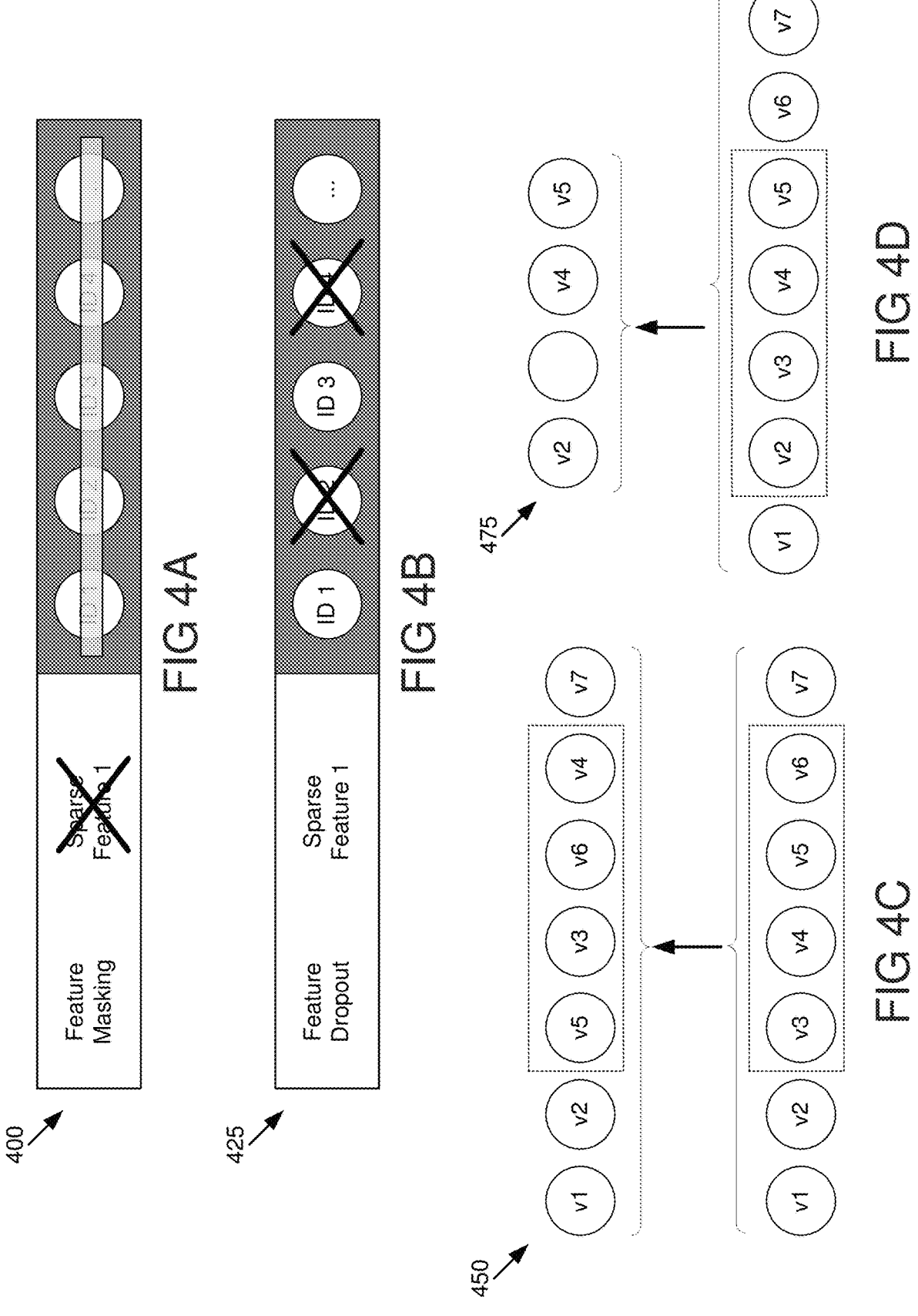
FIGS. 4A-4D are block diagrams of example types of feature augmentation, according to some embodiments described herein.

In one embodiment, the data augmentation module 202 performs feature masking by setting all values that correspond to a sparse feature to zero. The original training examples include a sparse feature with multiple values. For example, the sparse feature may be age and the discrete values correspond to ages 7-8, 9-10, etc. In another example, the sparse feature is a virtual experience (e.g., a game) and the discrete values correspond to user attributes, such as user interaction history, age, gender, etc. The data augmentation module 202 performs feature masking by generating an augmented training example by setting all the values of the sparse feature to zero. For example, the augmented training example does not consider age as a factor during training. In the other example, the data augmentation module 202 drops the user interaction history for 10% of the users. FIG. 4A is a block diagram 400 of feature masking that illustrates setting all of the values of the sparse feature to zero.

In one embodiment, the data augmentation module 202 performs feature dropout by generating an augmented training example by setting at least one of the values of the sparse feature to zero. FIG. 4B is a block diagram 425 of feature dropout illustrating that the second and fourth features are set to zero by the data augmentation module 202. For example, the augmented training examples may set the values for ages 9-10 and 11-12 to zero. The advantage of randomly dropping some of the values to zero is that it ensures that some values are not overly emphasized by the model. In another example, the sparse feature is a universe ID, which is the unique identifier for a particular virtual experience, and the values correspond to different universe IDs. By applying feature dropout the machine-learning model avoids over-indexing a particular universe ID for an established virtual experience to the detriment of newer virtual experience. By removing the universe ID for the established virtual experience, the machine-learning model outputs more recommendations for newer candidate virtual experiences.

In one embodiment, the data augmentation module 202 performs item reorder by shuffling a subset of a sparse feature with multiple values. For example, where a sparse feature includes two or more values, the augmented training example includes reordering at least a subset of the two or more values. As a result of item reordering, a machine-learning model relies less on the order of interaction sequences (e.g., a particular order in which a user played different games), which causes the machine-learning model to be more robust when encountering new virtual experiences (e.g., by not recommending the candidate virtual experiences in a particular order, which would result in excluding new virtual experience because they are not part of the particular order). This may be effective in sequential recommender modules, such as a recurrent neural network (RNN) or a transformer. FIG. 4C is a block diagram 450 of item reordering where the initial values are organized sequentially as v1 to v7 and, as a result of the reordering, the data augmentation module 202 changes the order to v1, v2, v5, v3, v6, v4, and v7.

In one embodiment, the data augmentation module 202 performs item crop by randomly selecting a continuous subsequence among a sparse feature with multiple values, and augments the sparse feature by cropping other values from the sparse feature. For example, the data augmentation module 202 may select a continuous subsequence from a sequence of two or more values and exclude at least one value of the two or more values. Item cropping may help the machine-learning model to learn local preferences of users. FIG. 4D is a block diagram 475 of item cropping where a sequence includes values v1 to v2, the continuous subsequence is values v2 to v5, and the data augmentation module 202 crops out v1, v6, and v7.

In one embodiment, the data augmentation module 202 performs dense feature augmentation. As discussed in greater detail below, the data augmentation module 202 trains a machine-learning model that applies a loss function with contrastive loss, for example, by projecting representation embeddings to a loss computation space. In some embodiments, for dense features the data augmentation module 202 randomly drops out hidden units in the loss computation space with a certain dropout probability, resulting in the hidden units not being counted. For example, an item feature for a virtual experience includes daily active users for the past 28 days, which is the number users that actively interacted with a virtual experience. The number of daily active users is typically higher for an established virtual experience because the longer the virtual experience is accessible, the more it is played. As a result, an established virtual experience may be recommended more than a new virtual experience due to the daily active user numbers. By applying the dense feature augmentation by removing the daily active users value, the data augmentation module 202 may ensure that the established virtual experience is not unfairly prioritized.

In one embodiment, the data augmentation module 202 performs embedding feature augmentation by randomly dropping out individual bits in feature embeddings with a predetermined dropout probability. In this example, the training examples include a feature embedding that includes bits and generating the augmented training examples includes modifying the bits, such as by randomly dropping individual bits from the feature embedding.

In one embodiment, the data augmentation module 202 performs random noise augmentation by adding random noise to input bits. The random noise may be used by the data augmentation module 202 to normalize the embedding bits.

The data augmentation module 202 extracts representative representation embeddings from the original training examples and the augmented training examples. The representative representation embeddings may include user embeddings and/or item embeddings that are used by the candidate generator module 206 to identify candidate virtual experiences or they are used by the candidate ranker module 208 to rank the candidate virtual experiences to recommend to a user.

The data augmentation module 202 determines a loss function based on the representative representation embeddings. The loss function may include a first loss and a second loss. The first loss minimizes a difference between representation embeddings of individual original training examples and representation embeddings of corresponding augmented training examples. That is because the individual original training examples and the augmented training examples are based on the same original training example.

The second loss maximizes a difference between the representation embeddings of individual original training examples and representation embeddings of non-corresponding augmented training examples. This is because the individual original training examples and the non-corresponding augmented training examples come from different input examples.

Figure 5:
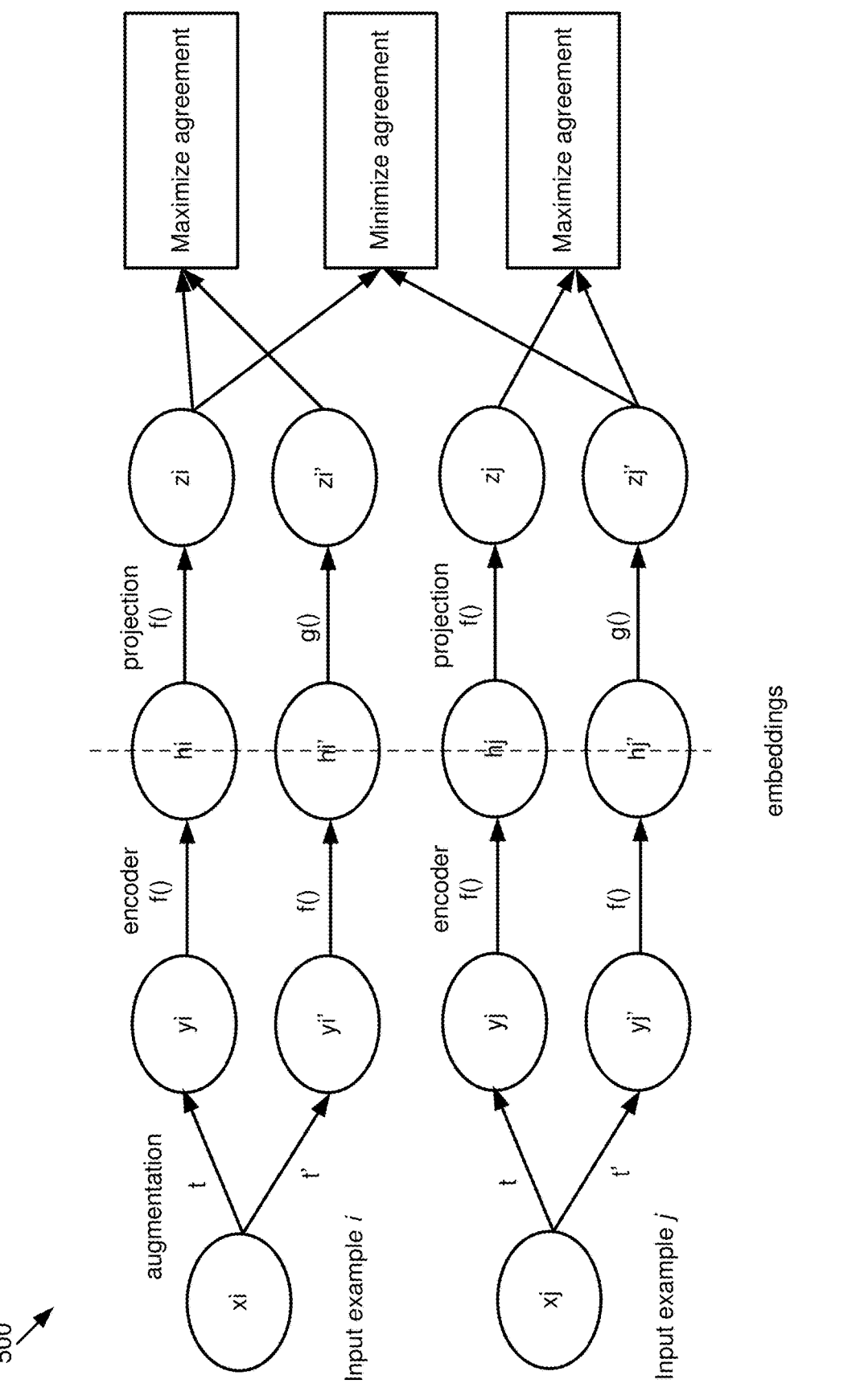
FIG. 5 is a block diagram of an example framework for contrastive learning with data augmentation, according to some embodiments described herein.

FIG. 5 is a block diagram 500 of an example framework for contrastive learning with data augmentation. In some embodiments, the example framework is a generalization of a DNN that was generated using self-supervised learning. The framework includes four components. First, once the data augmentation module 202 generates the augmented training examples, the data augmentation module 202 transforms a given input example randomly, resulting in two correlated views of the input features. In FIG. 5 the input examples are represented as $x_i$ and $x_j$. In applying this model to a computer vision example, the first input example may be an image of a Boston Terrier dog and the second input example may be an image of a French Poodle dog. The data augmentation module 202 generates augmented versions of the input examples. Specifically, the examples are now original example $y_i$ and augmented example $y_i'$, and original example $y_j$ and augmented example $y_j'$.

The data augmentation module 202 may apply a neural-network based encoder f( ) that extracts representation vectors or embeddings from the original training examples and the augmented training examples. The embeddings may represent user embeddings, item embeddings, feature embeddings, etc. These encoded embeddings are represented in FIG. 5 as $h_i$ and $h_{i'}$ for the input example i and $h_j$ and $h_{j'}$ for the input example j.

The data augmentation module 202 may apply a projection network g( ) that maps the embeddings to a space where contrastive loss is applied. These mapped embeddings are represented as $z_i$ and $z_{i'}$ for the input example i and $z_j$ and $z_{j'}$ for the input example j.

The data augmentation module 202 applies a loss function where the goal is to maximize the similarity between the pairs generated from the same example and to minimize the similarity between different pairs. Continuing with the above example, because the image of the Boston Terrier dog and the augmented image of the Boston Terrier dog are derived from the same input example, the similarity between the examples is maximized. This ensures that the original example and the augmented example are still recognized by the machine-learning model. Conversely, when the image of the Boston Terrier dog is compared to an augmented image of the French Poodle dog, the similarity between the examples is minimized.

When the data augmentation module 202 maximizes the similarity, it is considered self-supervised loss because the data augmentation module 202 performed augmentation on the input example, but when the data augmentation module 202 minimizes the similarity, it is considered supervised because the input examples are labelled as different examples.

In some embodiments, the data augmentation module 202 generates a first loss function for a candidate generator module 206 and a second loss function for a candidate ranker module 208. In some embodiments, the first loss function for the candidate generator module 206 is further divided into a supervised loss and a self-supervised loss.

A softmax function converts the numeric output of the last linear layer of a neural network into probabilities by taking the exponents of each output and normalizing each number by the sum of those exponents so the entire output vector adds up to one. The data augmentation module 202 may use a batch softmax supervised loss for candidate generation using the following equation:

$$\mathcal{L}_{main} = -\frac{1}{N} \sum_{i \in [N]} \log \frac{\exp(s(q_i, x_i)/\tau)}{\sum_{j \in [N]} \exp(s(q_i, x_i)/\tau)}. \qquad \text{(Eq. 1)}$$

where N is a number of examples, $x_i$ and $q_i$ are two-tower embedding vectors for example ($q_i$ is for the label and $x_i$ is for the item), s is a similarity function, such as a dot product, and $\tau$ is a tunable hyperparameter for the softmax temperature.

The data augmentation module 202 may determine self-supervised loss for candidate generation where embedding vectors from the same tower (i.e., for user features or item features as discussed in greater detail below with reference to FIG. 9) using the following equation:

$$\mathcal{L}_{self}(\{x_i\}; \mathcal{H}, \mathcal{G}) := -\frac{1}{N} \sum_{i \in [N]} \log \frac{\exp(s(z_i, z'_i)/\tau)}{\sum_{j \in [N]} \exp(s(z_i, z'_j)/\tau)} \qquad \text{(Eq. 2)}$$

where $z_i$, $z_{i'}$ denotes the embeddings of two augmentations ($y_i$, $y_{i'}$) of example i, ($z_i$, $z_{i'}$) represents positive pairs, and ($z_i$, $z_{j'}$) represents native pairs for i≠j. The loss function in equation 2 learns a robust embedding space such that similar items are close to each other after data augmentation and random examples are pushed farther away.

In some embodiments, the data augmentation module 202 generates the second loss function for the candidate ranker module 208. The data augmentation module 202 embeds vectors $\{z_i\}$ before the last neural network layer to apply contrastive losses. A(i) is the set of all indices distinct from i, P(i)={p∈ A(i): y˜p=y˜i} is the set of indices of all positives in the multi-viewed batch distinct from I, and |P(i)| is its cardinality. The second loss function is defined as the following contrastive loss equation:

$$\mathcal{L}_{out}^{sup} = \sum_{i \in I} \mathcal{L}_{out,i}^{sup} = \sum_{i \in I} \frac{-1}{|P(i)|} \sum_{p \in P(i)} \log \frac{\exp(z_i \cdot z_p/\tau)}{\sum_{a \in A(i)} \exp(z_i \cdot z_a/\tau)}$$

In some embodiments, the user engagement module 204 generates engagement embeddings. In some embodiments, the user engagement module 204 includes a set of instructions executable by the processor 235 to generate the engagement embeddings. In some embodiments, the user engagement module 204 is stored in the memory 237 of the computing device 200 and can be accessible and executable by the processor 235.

Figure 6:
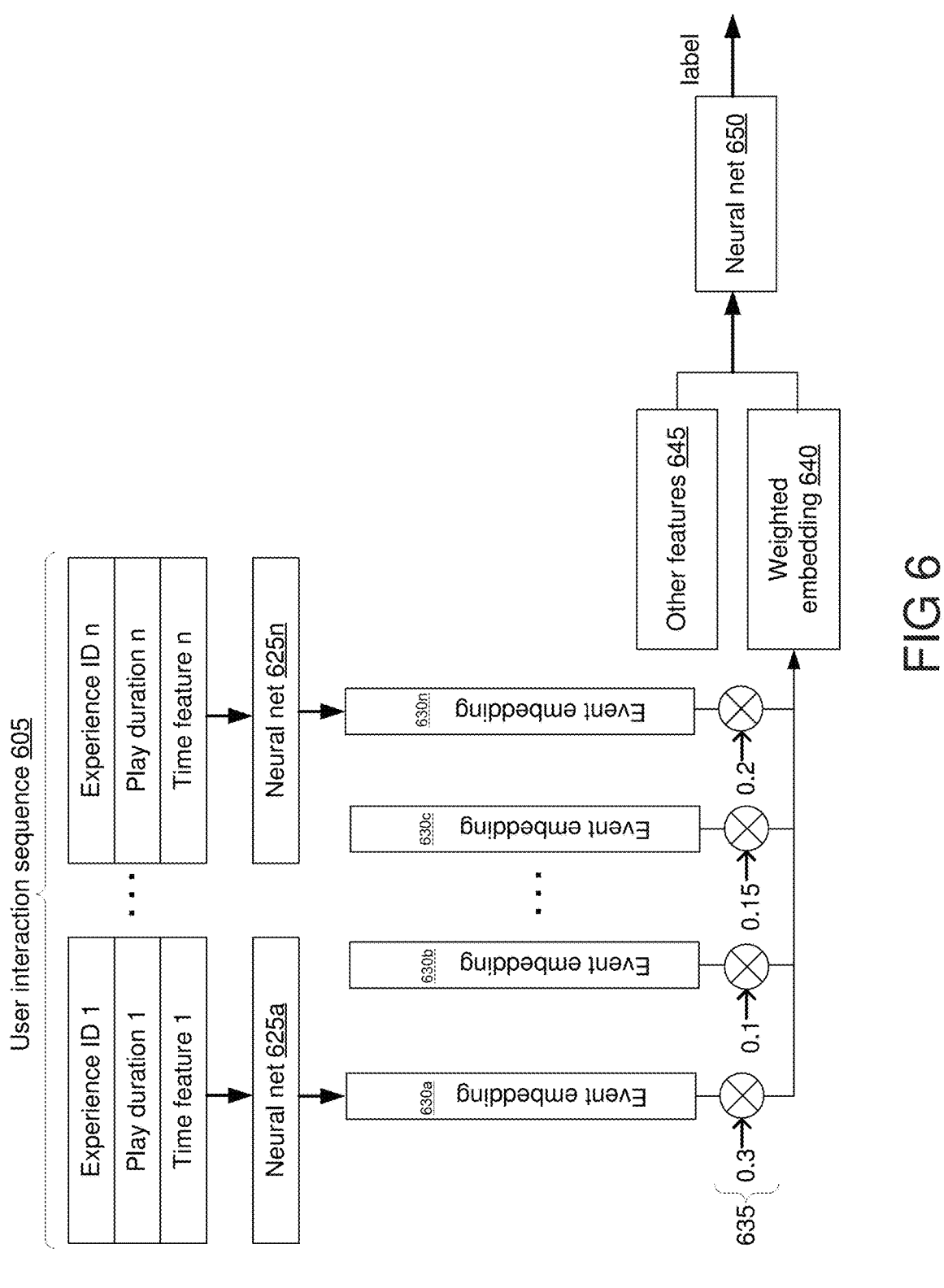
FIG. 6 is a block diagram of example learning weighted embeddings from user engagement sequences, according to some embodiments described herein.

The user engagement module 204 may use multiple architectures for generating a weighted embedding of user interaction sequences. FIG. 6 is a block diagram 600 of example learning weighted embeddings from user engagement sequences.

During training of the machine-learning model, the user engagement module 204 receives a user interaction sequence 605 that describes how a user interacts with a virtual experience. For example, the user interaction sequence may include an experience ID, a play duration, a time feature (e.g., how long ago the virtual experience was played, such as five days from the current date), a purchase history (e.g., in-game purchases), a click history, a play history, etc. The user engagement module 204 selects the top n of user interactions (e.g., the top n games that the user has played in the past) and concatenates different features. For example, for user interactions with experience 1, the user engagement module 204 identifies the play duration, how long ago the user played, the metadata of the virtual experience (genre, etc.). The user engagement module 204 provides each user interaction sequence as input to a neural network 625a, 625n with a multi-layer perceptron and outputs a learned embedding for the event that is referred to as an event embedding 630a, 630b, 630c, 630n.

During training, the neural network 625 also learns a weight vector 635 that represents the importance of each item with respect to the label prediction. For example, the weight of 0.3 has a higher predictive value for prediction of a user selecting that experience than the weight of 0.1.

The user engagement module 204 combines the event embeddings 630 and weight vectors 635 through a linear weighted combination of the embeddings to form a weighted embedding 640. This sequence modeling technique is quite efficient because the complexity is O(N), where N is the length of the user interaction sequence. The linear weighted combination improves model performance over using mean pooling or sum pooling to combine the embeddings in the sequence into one because the weights are learned to represent the importance of the item with respect to label prediction.

The weighted embedding 640 is concatenated with other features 645 and provided as input to a neural network 650 associated with the candidate generator module 206 and used to determine candidate virtual experiences or the neural network 650 is associated with the candidate ranker module 208 and used for determining a ranked subset of the candidate virtual experiences.

Figure 7:
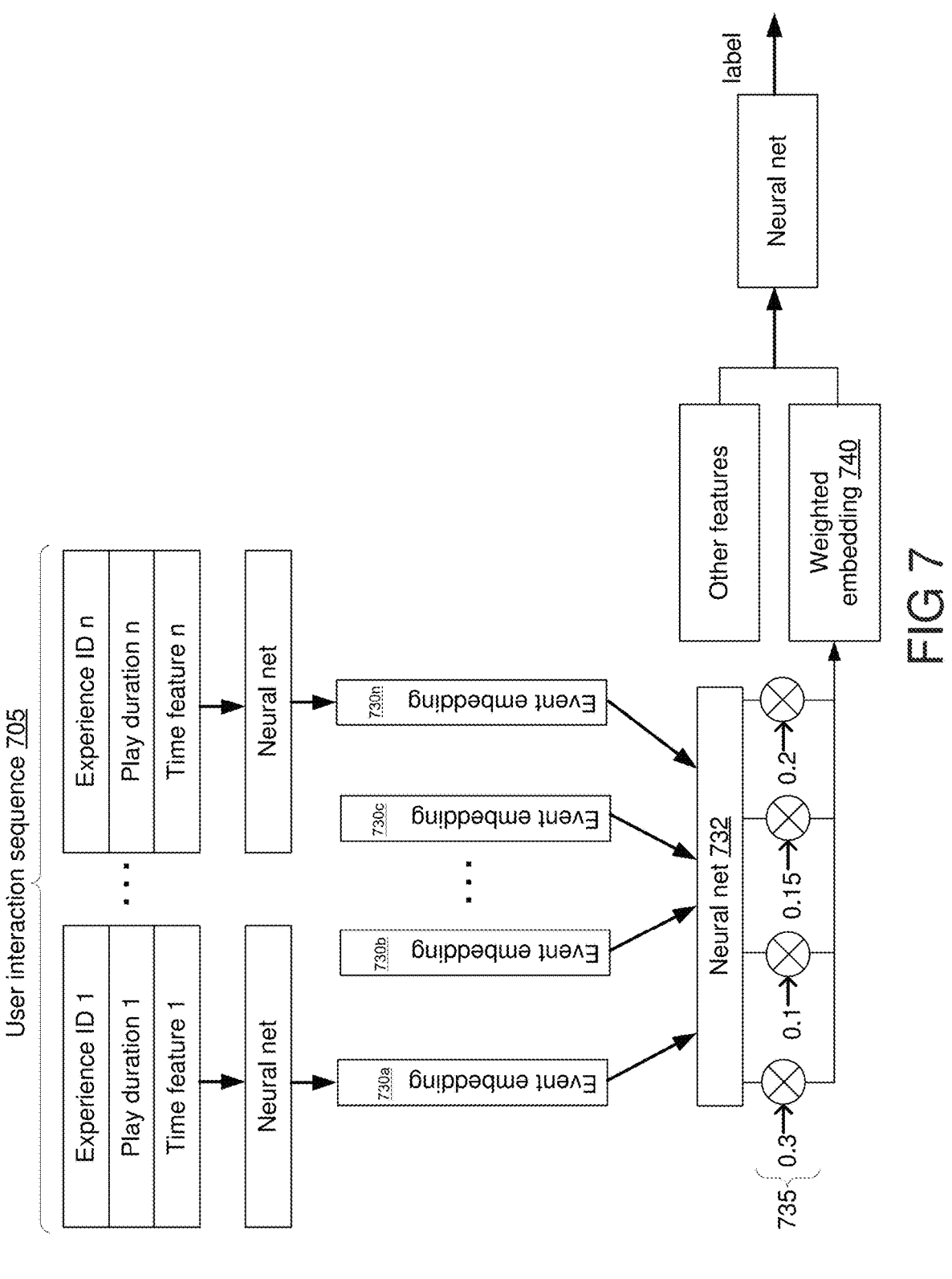
FIG. 7 is a block diagram of example weights that are learned through a neural network, according to some embodiments described herein.

FIG. 7 is a block diagram 700 of example weights that are learned through a neural network. In this example, the event embeddings 730a, 730b, 730c, 730n are provided as input to one or more layers of a neural network 732. In some embodiments, the neural network 732 has two layers where the event embedding is fed into the first layer and the second layer is the same layer as the vector (i.e., the weight vector 735). The second-layer vector (i.e., the weight vector 735) is multiplied by the event embedding 730a, 730b, 730c, 730n to determine the weighted embedding 740. The example in FIG. 7 captures the interaction among various virtual experiences as opposed to the linear-weighted combination in FIG. 6 where the event embeddings are independent of each other.

Figure 8:
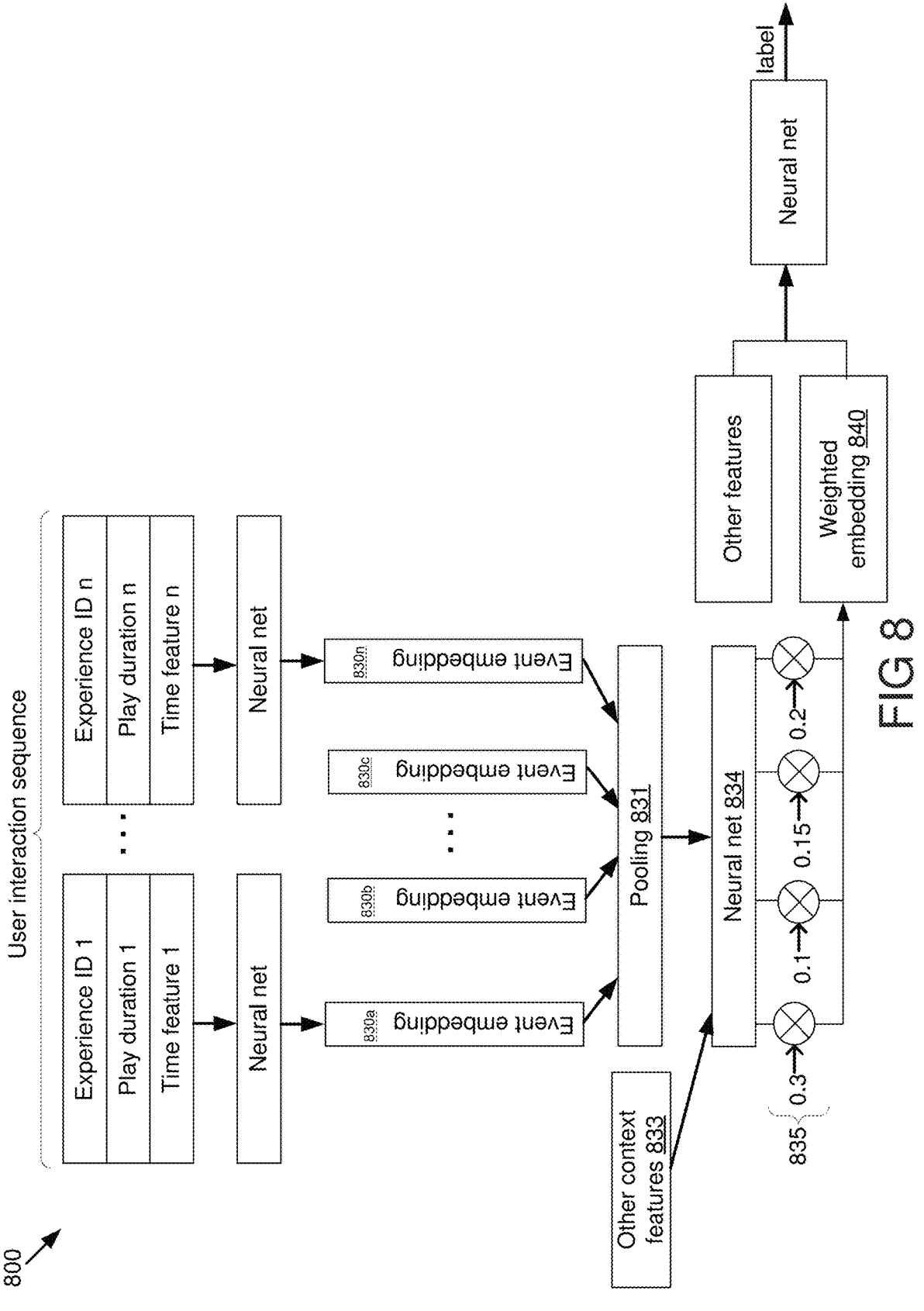
FIG. 8 is a block diagram of example weights that are learned from polled event embeddings and other context features, according to some embodiments described herein.

FIG. 8 is a block diagram 800 of example weights that are learned from polled event embeddings and other context features. FIG. 8 illustrates an architecture that learns general trends among users. For example, a younger person may be more interested in a first-person shooting game than an involved role-playing game. This may be particularly important when the user is associated with limited data.

The event embeddings 830*a*, 830*b*, 830*c*, 830*n* undergo pooling 831 to explicitly capture the user interests. The pooling 831 is either mean pooling where a mean of the event embeddings 830*a*, 830*b*, 830*c*, 830*n* is determined or sum pooling where a sum of the event embeddings 830*a*, 830*b*, 830*c*, 830*n* is determined. The pooling 831 is concatenated with other context features 833 that are particular to a user, such as time of day, device type, user features that may be relevant, etc. and provided as input to a neural network 834 to learn a weight per embedding, while considering the other context features 833. One example of a user feature that may be relevant is if the user tends to play very time-consuming games at night, but still plays games during the day. As a result of the concatenation, each event embedding 830*a*, 830*b*, 830*c*, 830*n* is co-learned with the other context features 833. The output of the neural network 834 are the learned weight vectors 835, which capture the context of the whole sequence. The learned weight vectors 835 are multiplied by the event embeddings 830*a*, 830*b*, 830*c*, 830*n* and are linearly combined to create the weighted embedding 840.

The candidate generator module 206 determines candidate virtual experiences for a particular user. In some embodiments, the candidate generator module 206 includes a set of instructions executable by the processor 235 to determine the candidate virtual experiences. In some embodiments, the candidate generator module 206 is stored in the memory 237 of the computing device 200 and can be accessible and executable by the processor 235.

In some embodiments, the candidate generator module 206 trains a machine-learning model that is a recommender model that identifies candidate virtual experiences. The recommender model is optimized for recall such that the output is a set of the most relevant candidate virtual experiences.

Figure 9:
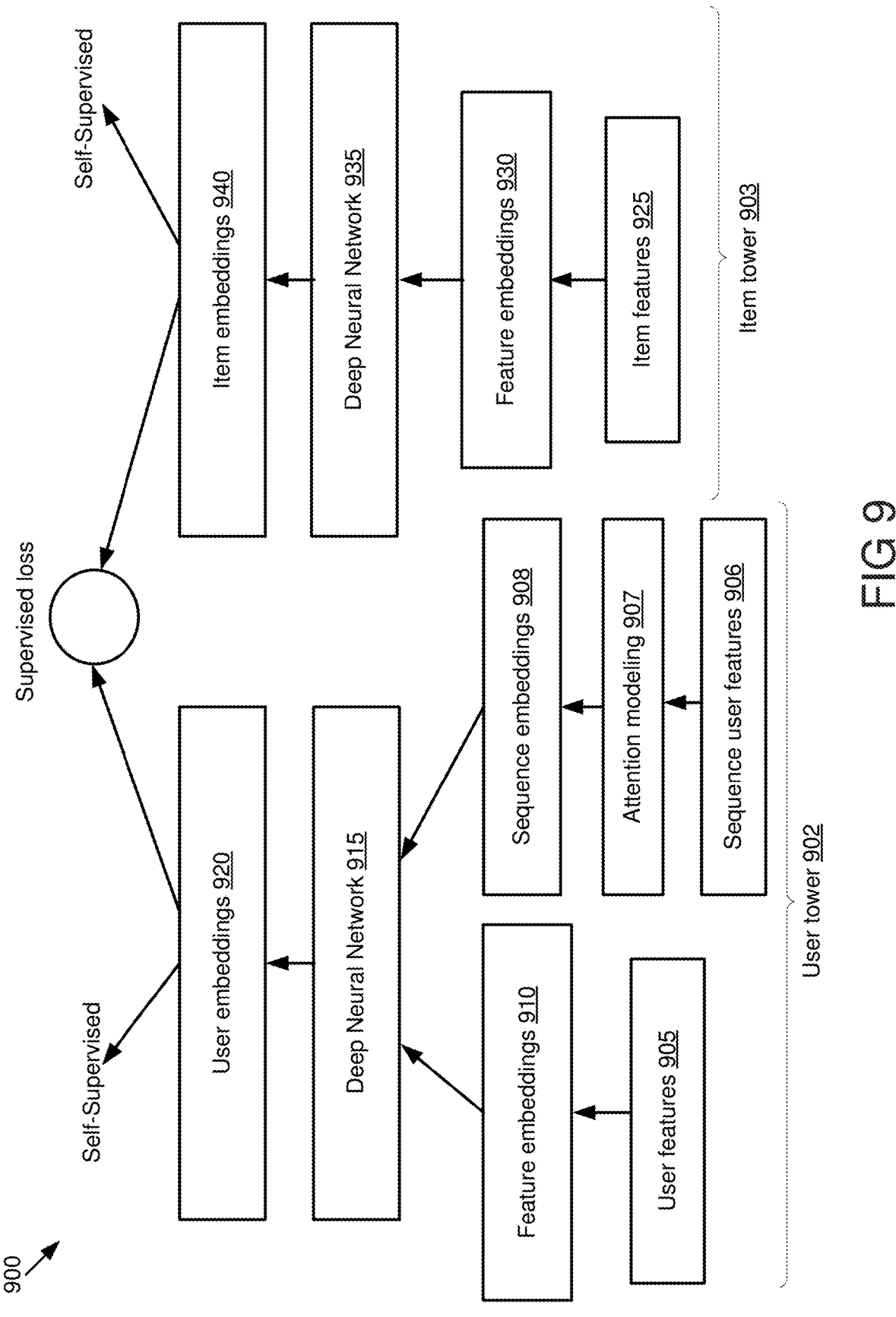
FIG. 9 is a block diagram of an example architecture for the candidate generator module to generate candidate virtual experiences, according to some embodiments described herein.

FIG. 9 is a block diagram of an example architecture 900 for the candidate generator module 206 to generate candidate virtual experiences. The example architecture 900 is a two-tower model made that includes a user tower 902 and an item tower 903. The two-tower model means that the user features 905 and the item features 925 are learned separately, i.e., there is no cross between the user features 905 and the item features 925 in the hidden layers of a neural network. Instead, the user features 905 and the item features 925 use independent DNNs, 915, 935.

In some embodiments, the user tower 902 includes user features 905, feature embeddings 910, sequence user features 906, sequence embeddings 908, a DNN 915, and user embeddings 920. In some embodiments, the user tower 902 includes only the user features 905, the feature embeddings 910, the DNN 915, and the user embeddings 920.

The candidate generator module 206 generates feature embeddings 910 from the user features 905. In some embodiments, the sequence user features 906 in FIG. 9 correspond to the user interaction sequence in FIGS. 6-8 and the attention modeling 907 corresponds to the neural net and event embedding in FIGS. 6-8.

The attention modeling 907 performs modeling of dependencies without regard to their distance in the input or the output sequences. The candidate generator module 206 performs attention modeling 907 on the sequence user features 906. For example, the attention modeling 907 analyzes the particular sequence of the user features, such as the order of experiences, how long the user interacted with virtual experiences, etc. and learns different weights in order to predict the future virtual experiences that the user is likely to select. The output of the attention modeling 907 is used to generate sequence embeddings 908. The sequence embeddings 908 reflect the importance of a sequence to a user's behavior. For example, the sequence embeddings 908 reflect a purchase sequence, a friend sequences (which friends interact with you more), engagement sequences (which is the model in FIGS. 6-8), etc.

In some embodiments, the feature embeddings 910 and the sequence embeddings 908 are provided as input to the DNN 915 and the output is used to generate the user embeddings 920. The DNN 915 learns the importance of the user sequences as embodied by the sequence embeddings 908 in connection with the feature embeddings 910. The user embeddings 920 reflect the representations of user features 905 and sequence user features 906 in the form of vectors that encode the user features 905 and the sequence embeddings 908 such that user features 905 that are closer in the vector space are expected to be more similar than user features 905 that are farther away.

The item tower 903 includes item features 925 that are converted into feature embeddings 930, which are provided as input to a DNN 935 and used to generate item embeddings 940. The item embeddings 940 reflect the representations of item features 925 in the form of vectors that encode the item features 925 such that item features 925 that are closer in the vector space are expected to be more similar than item features 925 that are farther away.

The candidate generator module 206 trains the two-tower model by determining a loss function for supervised loss and a loss function for self-supervised loss. The supervised loss illustrated in FIG. 9 represents data that is positively labelled or negatively labelled based on user actions after the user interacts with a virtual experience (e.g., by purchasing an item, clicking on something during the interaction, etc.). The self-supervised loss is generated by comparing the original training examples to the augmented training examples. The self-supervised loss may be defined using a loss function that is similar to the supervised loss. Alternatively, the self-supervised loss may be defined using a loss function that reduces the distance between user embeddings 920 or item embeddings 940.

Through training, the two-tower model learns to associate user embeddings 920 with item embeddings 940. Once the machine-learning model is trained, the candidate generator module 206 retrieves virtual experiences with item embeddings 940 that are closest to the user embeddings 920 in order to identify candidate virtual experiences for the user.

The candidate generator module 206 determines supervised loss based on the user interacting with a virtual experience (e.g., playing a game, purchasing an item, clicking on something during interactions with the virtual experience). The candidate generator module 206 determines self-supervised loss based on comparing the augmented training examples to the original training examples. In some embodiments, the self-supervised loss includes a first loss function for the user tower and a second loss function for the item tower. In some embodiments, the user features 905 and/or the item features 925 may include both augmented training examples and original training examples that are used to train the two-tower model.

Once the machine-learning model for the candidate generator module 206 is trained, the machine-learning model receives user features associated with a user as input. The machine-learning model generates a user embedding based on the user features and performs a dot product between the vectors for the user embeddings and the vectors for the already generated item embeddings. The machine-learning model performs an approximate neighbor search to determine the candidate virtual experiences that best correspond to the user features.

The candidate ranker module 208 ranks the recommended virtual experiences for a user. In some embodiments, the candidate ranker module 208 includes a set of instructions executable by the processor 235 to rank the recommended virtual experiences. In some embodiments, the candidate ranker module 208 is stored in the memory 237 of the computing device 200 and can be accessible and executable by the processor 235.

In some embodiments, the candidate ranker module 208 trains a machine-learning model that is a recommender model that identifies a subset of candidate virtual experiences. The recommender model is optimized for ranking the most relevant candidate virtual experiences. In some embodiments, the recommender model is further optimized based on a particular attribute, such as the best subset of candidate virtual experiences for a longest play time by the user.

Figure 10:
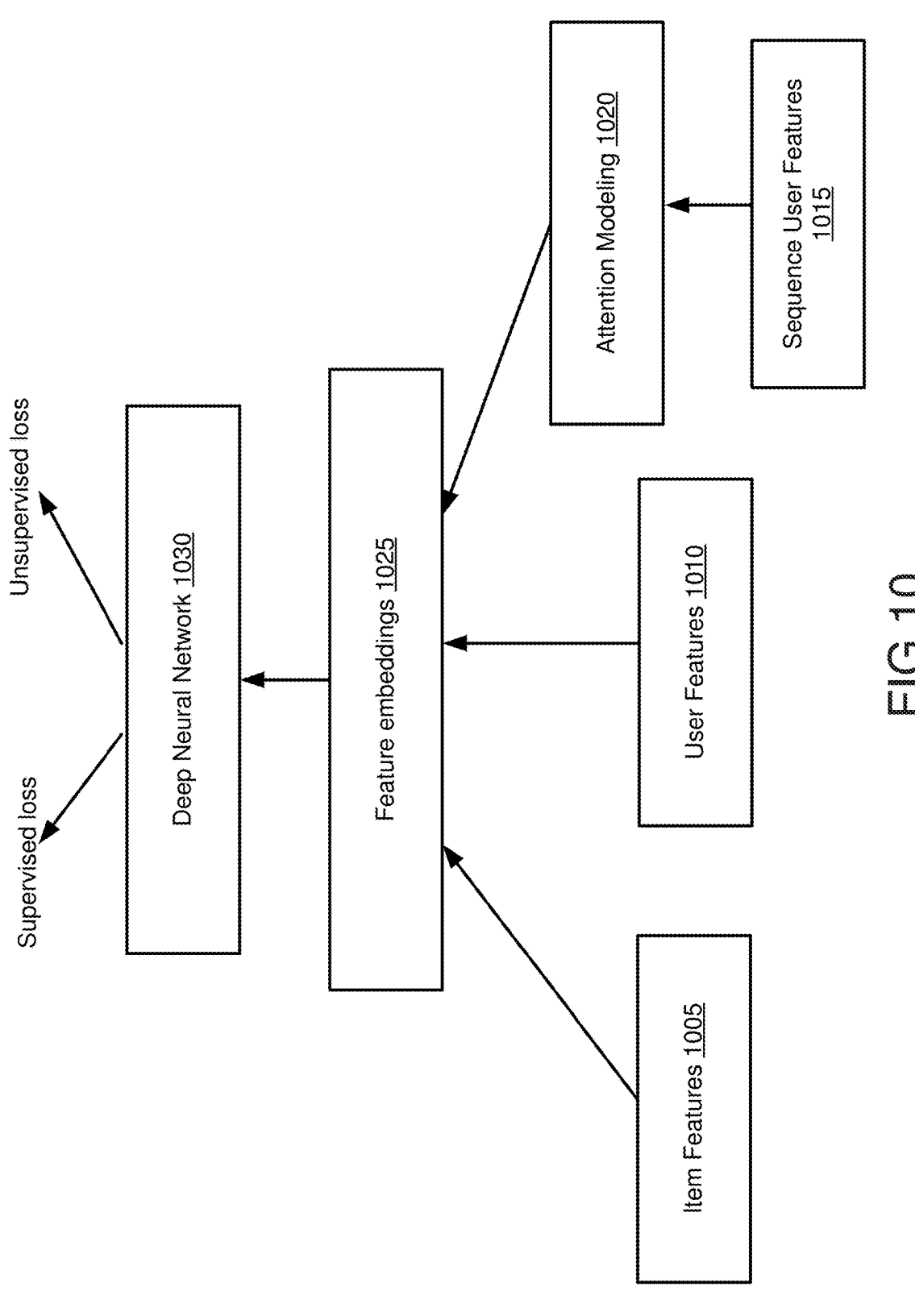
FIG. 10 is a block diagram of an example architecture of the candidate ranker module to rank the candidate virtual experiences, according to some embodiments described herein.

FIG. 10 is a block diagram of an example architecture 1000 of the candidate ranker module 208 to rank the candidate virtual experiences. The architecture 1000 includes item features 1005 and user features 1010 that are converted into feature embeddings 1025. The feature embeddings 1025 represents the fact that the item features 1005 and the user features 1010 are learned together and not independently as was illustrated in FIG. 9 with respect to the candidate generator module 206.

Sequence user features 1015 are different types of sequences performed by the user, such as purchase history, click history, play history, etc. as discussed with reference to the user engagement module 204. The sequence user features 1015 and the attention modeling 1020 may be the same as the sequence user features 906 and the attention modeling 907 in FIG. 9 that are used by the candidate generator module 206, but the information is used differently for the candidate ranker module 208. For example, if the candidate ranker module 208 is used to predict the virtual experiences where a user is expected to spend the most money, the in-experience spending (e.g., in-game spend) sequence is more important than a friend sequence and an engagement sequence and therefore more heavily weighted by the machine-learning model.

The attention modeling 1020 modifies the sequence user features and the results are converted into features embeddings 1025. The DNN 1030 receives the feature embeddings 1025 as input and ranks the candidate virtual experiences. In some embodiments, the hidden layers in the DNN 1030 are crossed, which results in the DNN learning a cross between item features and user features.

The original training examples and the augmented training examples pass through the same DNN 1030. Depending on how the features are augmented, the candidate ranker module 208 may share the bottom layer or the whole tower.

The supervised loss illustrated in FIG. 10 represents data that is positively labelled or negatively labelled based on a user action. For example, when a user clicks on a candidate virtual experience, the candidate virtual experience is associated with a positive label. When a user does not click on another candidate virtual experience, the candidate virtual experience is associated with a negative label, which is also captured by the supervised loss.

The self-supervised loss is generated by comparing the original training examples to the augmented training examples. The self-supervised loss may be defined using a loss function that is similar to the supervised loss. Alternatively, the self-supervised loss may be defined using a loss function that reduces the distance between feature embeddings 1025.

In some embodiments, the candidate ranker module 208 trains the machine-learning model to output a ranked subset of the candidate virtual experiences to recommend to the user. In some embodiments, machine-learning model receives, as input, a particular feature, such as the top virtual experience where a user is expected to play the longest, the top virtual experiences where the user is expected to spend the most money on purchases, the top virtual experience based on the current time of day, etc. As a result, the ranked subset of the candidate virtual experiences are the virtual experiences that are most likely to satisfy the input, such as the virtual experiences where the user is most likely to spend the most money.

The user interface module 210 generates a user interface for users 125 associated with user devices 115. The user interface may be used to display a user interface that includes one or more recommended virtual experiences for a user. The user interface may also include options for selecting the one or more recommended virtual experiences. In some embodiments, the user interface includes options for modifying options associated with the metaverse, such as options for configuring a user profile to include user preferences.

In some embodiments, once the candidate generator module 206 trains a first machine-learning model, the candidate generator module 206 provides first user features for a first user as input to the first machine-learning model. The first machine-learning model outputs candidate virtual experiences. In some embodiments, the candidate virtual experiences are provided as input to a second machine-learning model trained by the candidate ranker module 208. The second machine-learning model outputs a ranked subset of the candidate virtual experiences. The user interface module 201 generates graphical data for displaying a user interface that includes the ranked subset of the candidate virtual experiences. The user interface is provided to the user.

In some embodiments, before a user participates in the metaverse, the user interface module 210 generates a user interface that includes information about how the user's information is collected, stored, and analyzed. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

Example Methods

FIG. 11 is a flow diagram of an example method 1100 to train a machine-learning model using augmented training examples, according to some embodiments described herein. In some embodiments, the method 1100 is performed by the metaverse engine 103 stored on the server 101 in FIG. 1.

The method 1100 may begin at block 1102. At block 1102, training data is received that includes original training examples corresponding to a set of virtual experiences, where individual training examples comprise user features and item features. Block 1102 may be followed by block 1104.

At block 1104, augmented training examples are generated by modifying one or more of a user feature or an item feature from corresponding original training examples. Block 1104 may be followed by block 1106.

At block 1106, respective representation embeddings are extracted from the original training examples and the augmented training examples. Block 1106 may be followed by block 1108.

At block 1108, a loss function is determined such that: a first loss between representation embeddings of individual original training examples and representation embeddings of corresponding augmented training examples is minimizes; and a second loss between the representation embeddings of individual original training examples and representation embeddings of non-corresponding augmented training examples is maximized.

FIG. 12 is a flow diagram of an example method 1200 to train a machine-learning model to output a weighted embedding from user interaction sequences, according to some embodiments described herein. In some embodiments, the method 1200 is performed by the metaverse engine 103 stored on the server 101 in FIG. 1.

The method 1200 may begin at block 1202. At block 1202, training data is received that includes user interaction sequences that describe how a user interacts with virtual experiences. For example, the user interaction sequence may include how long the user played, what items were purchased, how long it has been since the user interacted with the virtual experience, etc. Block 1202 may be followed by block 1204.

At block 1204, the training data is provided as input to a neural network. Block 1204 may be followed by block 1206.

At block 1206, the neural network outputs corresponding event embeddings for each of the user interaction sequences and corresponding weight vectors that represent an importance of each item with respect to label prediction. In some embodiments, the event embeddings are provided to an additional neural network that outputs the corresponding weight vectors. In some embodiments, the event embeddings are pooled and provided as input to the additional neural network along with other context features, and the neural network outputs the corresponding weight vectors. Block 1206 may be followed by block 1208.

At block 1208, a weighted embedding is generated based on the event embeddings and the weight vectors. In some embodiments, the weighted embedding is a linear combination of the event embeddings and the weight vectors. In some embodiments, the weighted embedding is a product of the event embeddings and the weight vectors. The weighted embedding may be provided as input to a candidate generator module 206, which generates candidate virtual experiences, or a candidate ranker module 208, which generates a ranked subset of the candidate virtual experiences.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., user device only; client+server device; etc.) and where the data analysis is performed (e.g., user device only; client+server device; etc.). Data are utilized for the specific purposes as described herein. No data is shared with third parties without express user permission.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art, An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method to train a machine-learning model to recommend virtual experiences to a user, the method comprising:

receiving training data that includes original training examples corresponding to a set of virtual experiences, where individual training examples comprise user features and item features;

generating augmented training examples by modifying one or more of a user feature or an item feature from corresponding original training examples;

extracting respective representation embeddings from the original training examples and the augmented training examples; and determining, by a machine-learning model, a loss function, wherein the machine-learning model includes a user tower and an item tower, wherein the user tower includes a first deep neural network (DNN) that generates user embeddings based on the user features and the item tower includes a second DNN that generates item embeddings based on the item features and wherein the loss function is determined such that:

a first loss for the user tower between representation embeddings of individual original training examples and representation embeddings of corresponding augmented training examples is minimized; and a second loss for the item tower between the representation embeddings of individual original training examples and representation embeddings of non-corresponding augmented training examples is maximized.

2. The method of claim 1, wherein the original training examples include a sparse feature that includes a plurality of values, and generating the augmented training examples comprises setting at least one of the plurality of values of the sparse feature to zero.

3. The method of claim 2, wherein generating the augmented training examples comprises setting all of the plurality of values of the sparse feature to zero to mask the sparse feature.

4. The method of claim 1, wherein the augmented training examples include a sparse feature that includes a sequence of two or more values, and generating the augmented training examples comprises reordering at least a subset of the two or more values.

5. The method of claim 1, wherein the augmented training examples include a sparse feature that includes a sequence of two or more values, and generating the augmented training examples comprises selecting a continuous subsequence from the sequence of two or more values, wherein the continuous subsequence excludes at least one value of the two or more values.

6. The method of claim 1, further comprising, prior to determining the loss function, projecting the respective representation embeddings to a loss computation space.

7. The method of claim 1, wherein the original training examples include a feature embedding comprising a plurality of bits, and generating the augmented training examples comprises modifying one or more of the plurality of bits.

8. The method of claim 1, wherein the machine-learning model is a recommender model that identifies candidate virtual experiences or a ranking model that ranks the candidate virtual experiences to recommend to the user.

9. The method of claim 1, further comprising:

receiving first user features for a first user;

generating candidate virtual experiences;

determining, by the machine-learning model, a ranked subset of the candidate virtual experiences; and providing a user interface that includes the ranked subset of the candidate virtual experiences.

10. The method of claim 1, wherein the user embeddings are further based on sequence user features that are generated from user interactions with different virtual experiences and attention modeling.

11. The method of claim 10, wherein the attention modeling is trained by generating event embeddings for each set of user sequence features that correspond to a same user interaction sequence, generating weight vectors that correspond to the event embeddings, and generating a weighted embedding by multiplying the event embeddings by the weight vectors.

12. The method of claim 10, wherein the attention modeling is trained by generating event embeddings for each set of user sequence features that correspond to a same user interaction sequence, providing the event embeddings as input to a neural network, outputting weight vectors with the neural network, and generating a weighted embedding by multiplying the event embeddings by the weight vectors.

13. The method of claim 10, wherein the attention modeling is trained by generating event embeddings for each set of user sequence features that correspond to a same user interaction sequence, pooling the event embeddings and concatenating pooled event embeddings with the event embeddings as input along with other context features to a neural network, outputting weight vectors with the neural network, and generating a weighted embedding by multiplying the event embeddings by the weight vectors.

14. A device comprising:

a processor; and a memory coupled to the processor, with instructions stored thereon that, when executed by the processor, cause the processor to perform operations comprising:

receiving training data that includes original training examples corresponding to a set of virtual experiences, where individual training examples comprise user features and item features;

generating augmented training examples by modifying one or more of a user feature or an item feature from corresponding original training examples;

extracting respective representation embeddings from the original training examples and the augmented training examples; and determining, by a machine-learning model, a loss function, wherein the machine-learning model includes a user tower and an item tower, wherein the user tower includes a first deep neural network (DNN) that generates user embeddings based on the user features and the item tower includes a second DNN that generates item embeddings based on the item features and wherein the loss function is determined such that:

a first loss for the user tower between representation embeddings of individual original training examples and representation embeddings of corresponding augmented training examples is minimized; and a second loss for the item tower between the representation embeddings of individual original training examples and representation embeddings of non-corresponding augmented training examples is maximized.

15. The device of claim 14, wherein the original training examples include a sparse feature that includes a plurality of values, and generating the augmented training examples comprises setting at least one of the plurality of values of the sparse feature to zero.

16. The device of claim 15, wherein generating the augmented training examples comprises setting all of the plurality of values of the sparse feature to zero to mask the sparse feature.

17. A non-transitory computer-readable medium with instructions stored thereon that, when executed by one or more computers, cause the one or more computers to perform operations, the operations comprising:

receiving training data that includes original training examples corresponding to a set of virtual experiences, where individual training examples comprise user features and item features;

generating augmented training examples by modifying one or more of a user feature or an item feature from corresponding original training examples;

extracting respective representation embeddings from the original training examples and the augmented training examples; and determining, by a machine-learning model, a loss function, wherein the machine-learning model includes a user tower and an item tower, wherein the user tower includes a first deep neural network (DNN) that generates user embeddings based on the user features and the item tower includes a second DNN that generates item embeddings based on the item features and wherein the loss function is determined such that:

a first loss for the user tower between representation embeddings of individual original training examples and representation embeddings of corresponding augmented training examples is minimized; and a second loss for the item tower between the representation embeddings of individual original training examples and representation embeddings of non-corresponding augmented training examples is maximized.

18. The computer-readable medium of claim 17, wherein the original training examples include a sparse feature that includes a plurality of values, and generating the augmented training examples comprises setting at least one of the plurality of values of the sparse feature to zero.

19. The computer-readable medium of claim 18, wherein generating the augmented training examples comprises setting all of the plurality of values of the sparse feature to zero to mask the sparse feature.

20. The computer-readable medium of claim 17, wherein the user embeddings are further based on sequence user features that are generated from user interactions with different virtual experiences and attention modeling.

* * * * *